United States Patent
Woo et al.

(10) Patent No.: US 6,934,824 B2
(45) Date of Patent: Aug. 23, 2005

(54) DUAL-PORT MEMORY CONTROLLER FOR ADJUSTING DATA ACCESS TIMING

(75) Inventors: Hyo-seung Woo, Suwon (KR); Hak-seo Oh, Yongin (KR)

(73) Assignee: Samsung Electronics Co., Ltd., Suwon-si (KR)

(*) Notice: Subject to any disclaimer, the term of this patent is extended or adjusted under 35 U.S.C. 154(b) by 130 days.

(21) Appl. No.: 10/173,114

(22) Filed: Jun. 18, 2002

(65) Prior Publication Data

US 2003/0023823 A1 Jan. 30, 2003

(30) Foreign Application Priority Data

Jul. 28, 2001 (KR) ......................................... 2001-45761

(51) Int. Cl.[7] ............................................. G06F 12/00
(52) U.S. Cl. ......................... 711/168; 711/149; 711/152
(58) Field of Search .................. 711/149–152, 167–168

(56) References Cited

U.S. PATENT DOCUMENTS

| | | | |
|---|---|---|---|
| 6,233,659 B1 * | 5/2001 | Cohen et al. | ............... 711/153 |
| 6,334,174 B1 | 12/2001 | Delp et al. | |
| 6,370,067 B1 | 4/2002 | Ko et al. | |
| 6,557,085 B1 * | 4/2003 | Mattausch | ................... 711/150 |
| 6,625,699 B2 * | 9/2003 | Cohen et al. | ................ 711/150 |

* cited by examiner

*Primary Examiner*—Gary Portka

(57) ABSTRACT

A dual-port memory controller having a memory controller and at least one delaying unit. Since the memory controller executes a data access by selecting one processor, the memory controller outputs at least one request disapproval signal indicating that it cannot accept data access requests from other processors. The delaying unit includes a clock oscillator, and flip-flops receiving the clock signal and delaying the request disapproval signal. The delaying unit varies the delay time by varying the clock frequency of the clock oscillator. The memory controller executes data access to the same memory area after a predetermined period of time elapses, so processors can read/write stabilized data.

2 Claims, 5 Drawing Sheets

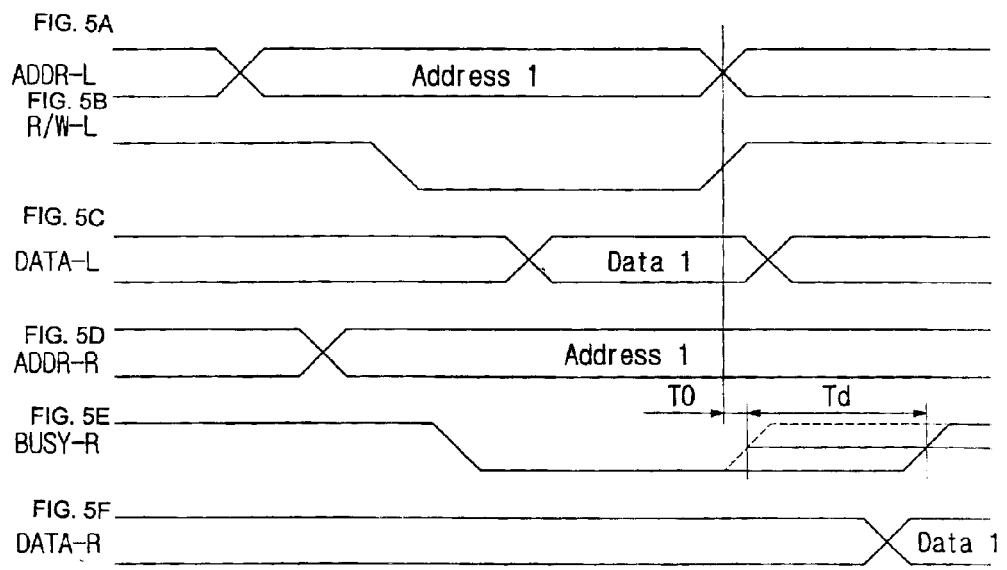

DUAL-PORT MEMORY CONTROLLER FOR ADJUSTING DATA ACCESS TIMING

CROSS-REFERENCE TO RELATED APPLICATIONS

This application claims the benefit of Korean Application No. 2001-45761, filed Jul. 28, 2001, in the Korean Patent Office, the disclosure of which is incorporated herein by reference.

BACKGROUND OF THE INVENTION

1. Field of the Invention

The present invention relates generally to dual-port memory controllers, and more particularly to a dual-port memory controller which can adjust data access timing of a processor.

2. Description of the Related Art

Generally, a dual-port memory controller is a device which includes a readable/writable memory (Random Access Memory), and controls operations of inputting/outputting data to read/write data in response to requests from external processors.

An example in which two processors are connected to a dual-port memory controller to perform data access operations for a memory area is described with reference to FIG. 1.

As shown in FIG. 1, a conventional dual-port memory controller 1 comprises data controllers 10 and 10a to individually input/output data to/from a plurality of processors, address decoders 20 and 20a to individually decode addresses outputted from the processors, a memory 30 to store data, and a memory controller 40 to control operations of accessing data in a predetermined memory area by the processors. Further, the conventional dual-port memory controller 1 comprises enable generators 3 and 3a, and arbitrators 5 and 5a, respectively, corresponding to the processors. The enable generators 3 and 3a receive output enable signals OE-L and OE-R, chip select signals CS-L and CS-R and read/write signals R/W-L and R/W-R, respectively, from the processors. The arbitrators 5 and 5a receive the chip select signals CS-L and CS-R and read/write signals R/W-L and R/W-R, respectively, from the processors.

The dual-port memory controller 1 can accept data access requests from two processors. The two processors output address signals ADDR-L and ADDR-R, the chip select signals CS-L and CS-R and the read/write signals R/W-L and R/W-R, respectively, to the memory controller 40 so as to access a memory area of a specific address in the memory 30. In this case, the memory controller 40 determines which area of the memory is selected and whether an operation is about reading or writing according to inputted signals. If the operation is about writing, the memory controller 40 writes data inputted through signals DATA-L and DATA-R, respectively, in a selected memory area of the memory 30; while if the operation is about reading, the memory controller 40 reads data from a selected memory area of the memory 30 and outputs the data to a corresponding processor through data signals DATA-L and DATA-R, respectively.

If the processors request different memory areas in the memory 30, the dual-port memory controller 1 can simultaneously accept different requests and perform data access operations.

However, if the processors simultaneously request the dual-port memory controller 1 to access the memory area of a same address, a collision between signals in a signal line occurs, thus causing a malfunction producing damage to the data.

The memory controller 40 first processes a data access operation for any one processor. After the data access operation is finished, the memory controller 40 sends a signal indicating that it can accept data access requests from the other processor. Then, according to the signal, the other processor can execute data access to a corresponding memory area.

In other words, if requests to access the same memory area are almost simultaneously received from two processors, the memory controller 40 first executes a request received earlier. At this time, the memory controller 40 outputs a request disapproval signal BUSY-L or BUSY-R indicating that the memory controller 40 cannot accept the other request because a prior processor is accessing the memory area of a corresponding address, thus allowing the other processor to access the corresponding memory area later.

If simultaneous data access requests for the same memory area are received from two processors, the memory controller 40 arbitrarily designates any of two requests and processes the designated request first. At this time, the memory controller 40 sends the request disapproval signal BUSY-L or BUSY-R indicating that the memory controller 40 cannot accept the request to a processor whose request is not processed, thus instructing the processor to access the corresponding memory area again next time.

FIGS. 2A through 2F are timing diagrams showing each signal when two processors request access to the same memory area according to the conventional dual-port memory controller, and show a case where an L-side processor requests access to the memory prior to an R-side processor. At this time, the request of the L-side processor is "writing data in a memory area of an address 1" while the request of the R-side processor is "reading data from a memory area of an address 1".

Since the "address 1" corresponding to a memory area of the memory 30 is requested by both the L-side and R-side processors at the same time, the memory controller 40 cannot simultaneously accept requests from the L-side and R-side processors. Therefore, the memory controller 40, for example, accepts the request from the L-side processor prior to an R-side processor and the L-side processor requests to perform a write operation. At this time, the memory controller 40 outputs a logic "0" signal indicating that the memory controller 40 cannot accept a data access request from the R-side processor, as an activated request disapproval signal BUSY-R to the R-side processor.

Then, the memory controller 40 outputs a logic "1" signal, as an inactivated request disapproval signal BUSY-R to accept the request from the R-side processor, when the read/write signal of the L-side processor becomes a logic "1" signal during the end of an operation of writing data "1" in a memory area of the address 1 of the memory 30 according to the request from the L-side processor.

At this time, if the R-side processor immediately performs an operation of "reading data from a memory area of the address 1" at a time period T1 when the R-side processor recognizes that the request disapproval signal BUSY-R changes from an activated state to an inactivated state, unstabilized data are read because the data write operation by the L-side processor is not completely finished, thus causing damage to the data. That is, a data value read from the memory area of address 1 by the R-side processor may be different from real data 1.

Such a conventional problem is more clearly seen in a processor having a fast data access time. Actually, in a processor having a data access time of 10 ns, 20 ns, or 25 ns, data malfunction which cannot be disregarded can be caused by the above-described problem. Therefore, the problem is a subject which must be seriously considered in robot automatic control fields applying a multi-system.

SUMMARY OF THE INVENTION

Accordingly, the present invention is to provide a dual-port memory controller, which can adjust data access timing of a processor by delaying a signal indicating that a data access request is not acceptable for a predetermined period of time so as to stably read/write data from/to a memory area.

Additional objects and advantages of the invention will be set forth in part in the description which follows and, in part, will be obvious from the description, or may be learned by practice of the invention.

In order to accomplish the above and other objects, the present invention provides a dual-port memory controller for enabling a plurality of processors to access a memory area to read/write data, comprising at least one data controller individually inputting/outputting data to/from the processors; a memory controller outputting at least one signal accepting data access requests from other processors after finishing a data access operation for one processor; and at least one delay unit delaying the signal outputted from the memory controller to one or more other processors.

The delay unit may delay said signal for a predetermined period of time required to stably read/write data.

The delay might include a clock oscillator generating a clock signal of a predetermined frequency, and flip-flops receiving the clock signal and delaying said signals. Preferably, the delay time of the signal varies if the clock frequency varies, wherein the delay time becomes longer if the clock frequency becomes higher.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 5A through 5F are timing diagrams showing each signal when a memory area of the same address is accessed according to the embodiment of the present invention of FIG. 3.

DESCRIPTION OF THE PREFERRED EMBODIMENTS

Figure 1:
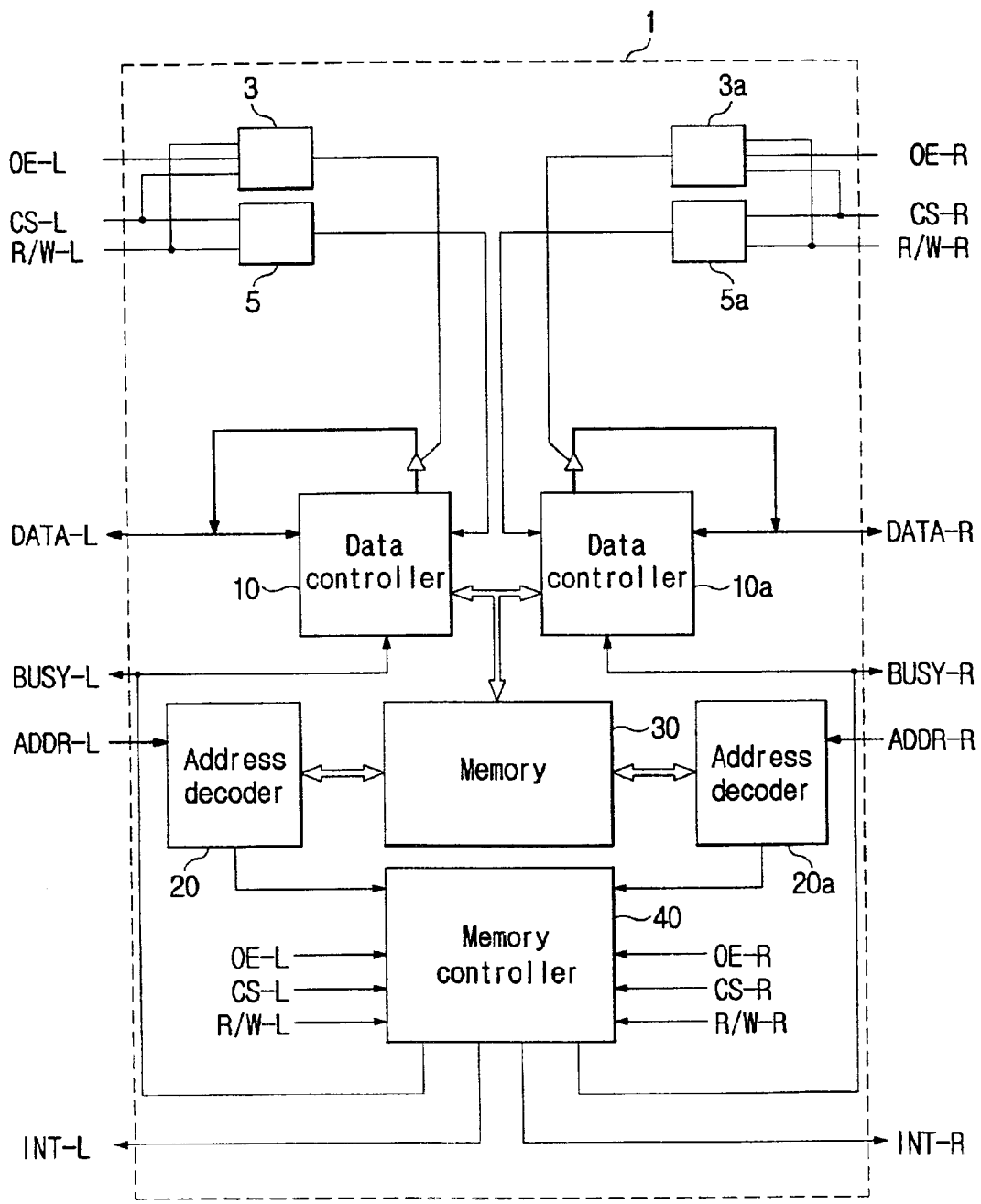
FIG. 1 is a block diagram of a conventional dual-port memory controller.
Figure 2:
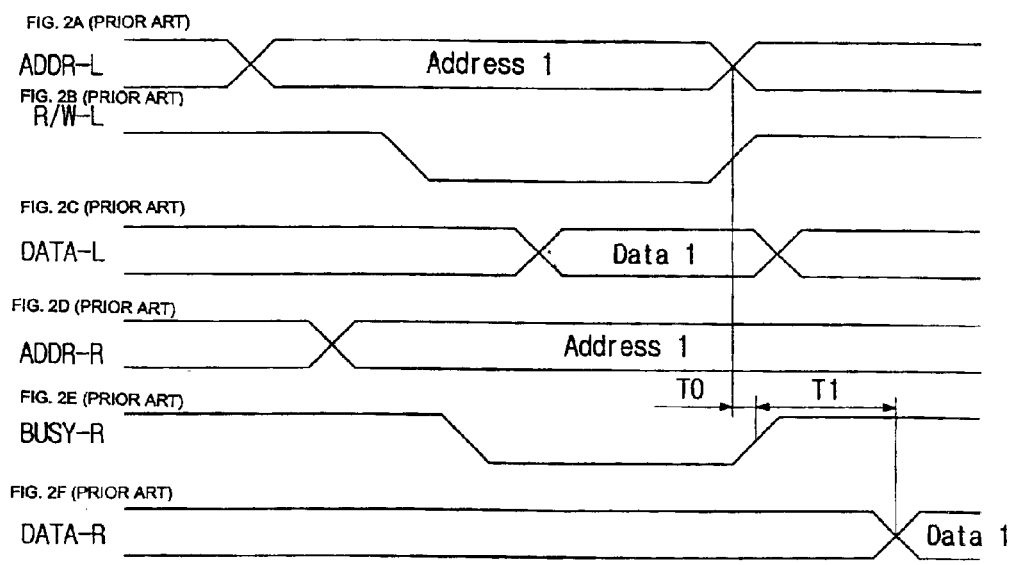
FIGS. 2A through 2F are timing diagrams showing each signal when a memory area of the same address is accessed according to the conventional dual-port memory controller.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

A dual-port memory controller of the present invention is defined as a memory controller allowing a plurality of processors to access a memory, and two processors of the processors may simultaneously access the memory.

Figure 3:
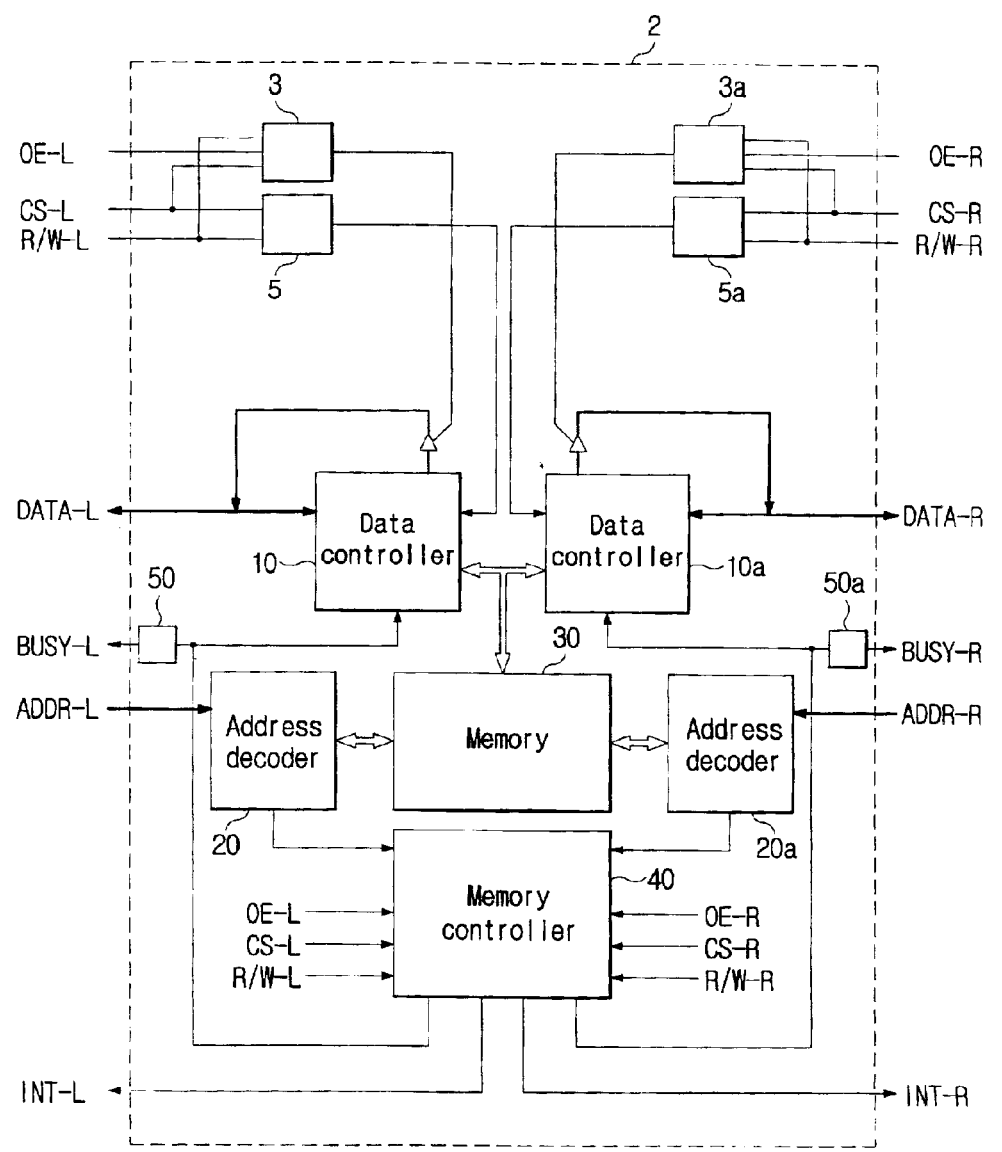
FIG. 3 is a block diagram of a dual-port memory controller according to an embodiment of the present invention.

FIG. 3 is a block diagram of a dual-port memory controller, in which the same reference numerals are used throughout FIGS. 1 and 2A through 2F to designate the same or similar components.

The dual-port memory controller 2 of the present invention comprises data controllers 10 and 10a to individually input/output data to/from a plurality of processors, address decoders 20 and 20a to individually decode addresses from the processors, a memory 30 to store data, a memory controller 40 to control the operations of accessing data in a predetermined memory area by the processors, enable generators 3 and 3a, and arbitrators 5 and 5a.

Figure 4:
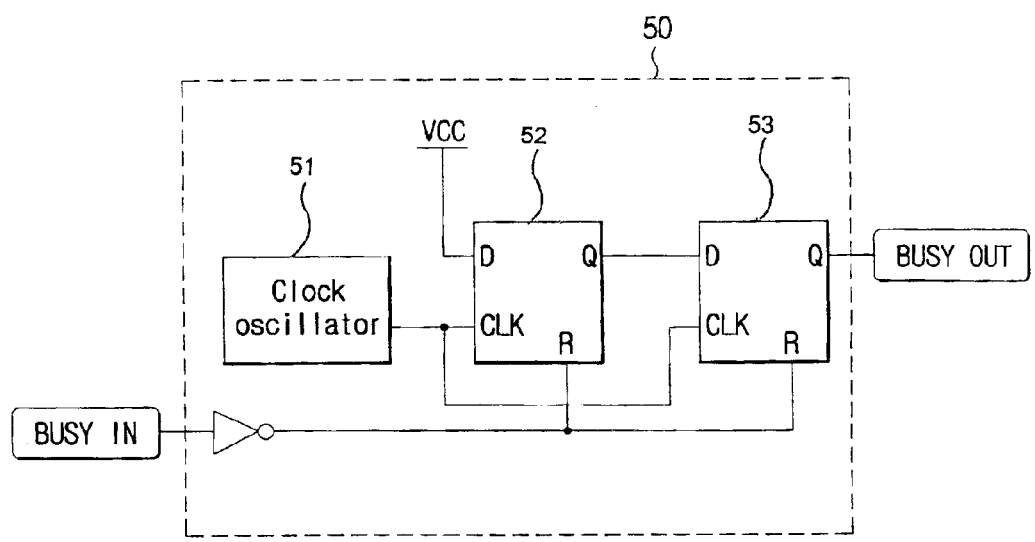
FIG. 4 is a block diagram of a delay unit in the dual-port memory controller of FIG. 3.

The dual-port memory controller 2 further comprises delay units 50 and 50a connected between the memory controller 40 and L-side and R-side processors, respectively. The delay units 50 and 50a serve to delay request disapproval signals BUSY-L and BUSY-R outputted from the memory controller 40. Further, the delay units 50 and 50a can be realized using a clock oscillator and two flip-flops, as shown in FIG. 4. Alternatively, a delay circuit capable of delaying the request disapproval signals BUSY-L and BUSY-R for a predetermined period of time can be used instead of delay units] the delay unit described above.

The dual-port memory controller 2 can accept data access requests from two processors. The memory controller 40 determines which area of the memory 30 is selected and whether an operation is about reading or writing according to requests from a plurality of processors. At this time, if the operation is about writing, the memory controller 40 writes data inputted through signals DATA-L and DATA-R, respectively, in a selected memory area of the memory 30; while if the operation is about reading, the memory controller 40 reads data from a selected memory area of the memory 30 and outputs the data to a corresponding processor through data signals DATA-L and DATA-R, respectively.

The memory controller 40 first processes a data access operation for any one processor. After the data access operation is finished, the memory controller 40 sends a signal indicating that it can accept a data access request from the other processor. Then, according to the signal, the other processor can execute data access to a corresponding memory area.

If requests to access the same memory area are almost simultaneously received from two processors, the memory controller 40 first executes a request received earlier. At this time, the memory controller 40 outputs a request disapproval signal BUSY-L or BUSY-R indicating that the memory controller 40 cannot accept the other request because a prior processor is accessing the memory area of a corresponding address, thus allowing the other processor to again access the corresponding memory area later.

If simultaneous data access requests for the same memory area are received from two processors, the memory controller 40 arbitrarily designates any one of two requests and processes the designated request first. At this time, the memory controller 40 sends the request disapproval signal BUSY-L or BUSY-R indicating that the memory controller 40 cannot accept the request to a processor whose request is not processed, thus instructing the processor to access the corresponding memory area again next time.

After completing a data access process, which is first executed for any one processor, the memory controller 40 generates a signal indicating that the memory controller 40 can accept a data access request from the other processor, as an inactivated request disapproval signal BUSY-L or BUSY-R. The inactivated request disapproval signal BUSY-L or BUSY-R is applied to the delay unit 50 or 50a, respectively.

The delay unit 50 or 50a, respectively, delays the inactivated request disapproval signal BUSY-L or BUSY-R for a predetermined period of time corresponding to a clock frequency of the clock oscillator, and then outputs the delayed signal to the other processor. Accordingly, the other processor recognizes the delayed request disapproval signal BUSY-L or BUSY-R. As a result, the other processor accesses a corresponding memory area after the predetermined period of time elapses, so the processor can read/write data stably.

FIGS. 5A through 5F are timing diagrams showing each signal if a memory area of the same address is accessed, and show a case where an L-side processor requests access to the memory 30 prior to an R-side processor. At this time, the request from the L-side processor is "writing data in a memory area of an address 1" while the request of the R-side processor is "reading data from the memory area of the address 1".

Since the "address 1" corresponding to the memory area of the memory 30 is requested by both the L-side and R-side processors, the memory controller 40 cannot simultaneously accept requests from the L-side and R-side processors. Therefore, the memory controller 40 accepts the request from the L-side processor, which requests the data access first, to perform a write operation. At this time, the memory controller 40 outputs a logic "0" signal indicating that it cannot accept a data access request from the R-side processor, as an activated request disapproval signal BUSY-R to the R-side processor.

Then, the memory controller 40 outputs to the delay unit 50a a logic "1" signal, as an inactivated request disapproval signal BUSY-R so as to accept the request from the R-side processor, when the read/write signal of the L-side processor becomes a logic "1" signal during the end of an operation of writing data "1" in a memory area of the address 1 of the memory 30 according to the request from the L-side processor. The delay unit 50a delays the inactivated request disapproval signal BUSY-R to correspond to the clock frequency of the clock oscillator 51, and then outputs the delayed signal to the R-side processor through an output terminal of a flip-flop 52 and 53.

The R-side processor recognizes that the delayed request disapproval signal BUSY-R transitions from an activated state to an inactivated state, and performs an operation of "reading data from the memory area of the address 1". Here, since the R-side processor executes a data access operation at a delayed time period Td, the R-side processor reads stabilized data, such that no damage to the data occurs. That is, the R-side processor can read the same data value as data 1 written in the memory area of the address 1 by the L-side processor.

As described above, the dual-port memory controller of the present invention receives data access requests for the same memory area from a plurality of processors, and first designates a request from any one processor to be executed. Then, the dual-port memory controller delays a signal indicating that the dual-port memory controller can accept requests from other processors for a predetermined period of time, and outputs the delayed signal to other processors. Therefore, other processors access data in the same memory area after a predetermined period of time elapses, such that the other processors can read and write stabilized data.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A dual-port memory controller for enabling a plurality of processors to access a memory area to read/write data, comprising:

at least one data controller individually inputting data to or outputting data from the processors;

a memory controller outputting at least one signal to accept or not accept data access requests from other processors after finishing a data access operation for one processor; and at least one delay unit delaying only the signal outputted from the memory controller to one or more other processors, wherein the delaying unit includes a clock oscillator generating a clock signal of a predetermined frequency, and flip-flops receiving the clock signal and delaying the signal, wherein the delaying until operates such that a delay time of said signal varies if the clock frequency of the clock oscillator varies and delays the signal for a predetermined period of time so as to stably read/write the data, and wherein the delay time becomes longer if the clock frequency becomes higher.

2. A method using a dual-port memory controller for enabling a plurality of processors to access a memory area to read/write data, comprising:

inputting data to or outputting data from the processors;

outputting at least one signal from the memory controller to accept data access requests from other processors after finishing a data access operation for one processor; and delaying only the signal outputted from the memory controller to one or more other processors, wherein said delaying delays said signal for a predetermined period of time so as to stably read/write the data, wherein delaying the signal comprises:

generating a clock signal of a predetermined frequency; and receiving the generated clock signal by flip-flops to output the delayed signal, wherein the delayed signal operates such that a delay time of the delayed signal varies according to a clock frequency, and wherein the delay time of said delay signal becomes longer if the clock frequency becomes higher.

* * * * *

UNITED STATES PATENT AND TRADEMARK OFFICE
CERTIFICATE OF CORRECTION

PATENT NO.   : 6,934,824 B2
DATED        : August 23, 2005
INVENTOR(S)  : Hyo-seung Woo et al.

It is certified that error appears in the above-identified patent and that said Letters Patent is hereby corrected as shown below:

Column 6,
Line 31, replace "until" with -- unit --.

Signed and Sealed this

Thirteenth Day of June, 2006

JON W. DUDAS
*Director of the United States Patent and Trademark Office*